United States Patent [19]

Schamberger

[11] Patent Number: 5,727,309
[45] Date of Patent: Mar. 17, 1998

[54] METHOD OF ATTACHING A CONTROLLER HOUSING TO A PANEL

[75] Inventor: Stephen Schamberger, Kendallville, Ind.

[73] Assignee: Eaton Coporation, Cleveland, Ohio

[21] Appl. No.: 756,090

[22] Filed: Nov. 22, 1996

[51] Int. Cl.⁶ .............................. B23P 11/00; H01H 11/00
[52] U.S. Cl. .................... 29/622; 29/505; 174/66; 200/296; 220/3.92; 403/316; 403/325
[58] Field of Search ..................... 29/622, 505; 174/66; 200/296; 220/3.8, 3.9, 3.92, 3.94, 4.02; 403/316, 321, 325

[56] References Cited

U.S. PATENT DOCUMENTS 3,127,145  3/1964  McGinty ........................... 220/3.9
4,184,730  1/1980  Huebner ........................... 29/622
5,256,841  10/1993 Zanella ............................ 200/296

*Primary Examiner*—P. W. Echols
*Attorney, Agent, or Firm*—Roger A. Johnston

[57] ABSTRACT

A controller having a housing with a cover plate attached and a user moveable control shaft extending from the housing. The cover plate has a spring member with tabs attached which permits the cover to be attached to the housing over the shaft and the assembly shaft inserted into a clearance hole in a panel to which it is to be attached and pivoted into locking tabs on the panel and the spring tabs cammed along the panel surface deflecting the spring until the spring tabs drop into an aperture provided in the panel, locking the cover plate and housing to the panel.

12 Claims, 5 Drawing Sheets

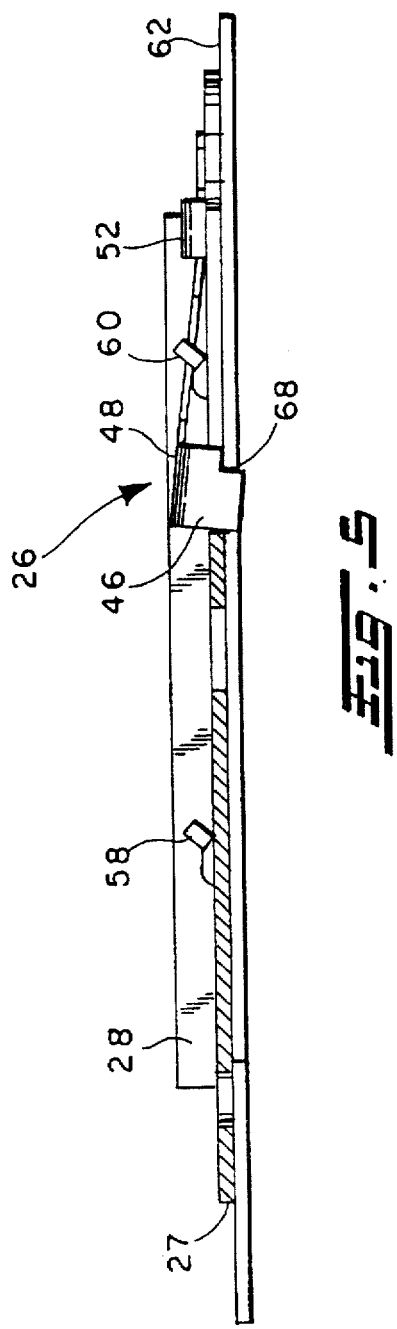

METHOD OF ATTACHING A CONTROLLER HOUSING TO A PANEL

BACKGROUND OF THE INVENTION

The present invention relates to the mounting of user settable control switches onto a panel and particularly switches of the type employing thermostatic operators for controlling the making and breaking of a set of switch contacts at a user selected point within a range of operating parameters of the load to be switched. In particular, the invention relates to attachment to a panel of user settable thermostatic switches of the type employed for controlling heating/burner units utilized in cooking appliances. Typically, thermostatic controllers of this type are employed on a control panel for a top burner of an electric cooking stove or for a resistance heating element employed in an electric oven. Such known controllers typically employ a user-rotatable shaft extending through the control panel for selection of the setting of the controller set point within the service range.

Heretofore, thermostatic control switches employed for panel mounting in cooking appliances have required separate fasteners for attachment of the switch assembly to the panel. This has resulted in an inherent cost during manufacturing, particularly in the competitive market of high-volume household cooking appliances. Typically, the thermostatic user settable switch controller is assembled in a dielectric housing and a metal cover plate is attached to the switch housing; and, the assembly is then secured to a panel by fasteners engaging the cover plate with the control shaft extending through the panel. In a typical household cooking appliance, the controller switch has a user rotatable knob provided on the shale extending through an aperture in the panel, with the cover plate of the switch housing flush against the reverse or back surface of the control panel.

It has thus been desired to provide a way or means of attaching a switch controller assembly and particularly a thermostatic switch controller to the back of a control panel with a user moveable control element extending through the face of the panel and to provide such attachment without the requirement for separate fasteners. It has particularly been desired to provide for attaching a thermostatic switch controller for cycling a heater to the back of a control panel without fasteners in a manner which is easy to install in high-volume mass production and which is relatively low in cost.

BRIEF SUMMARY OF THE INVENTION

It is an object of the present invention to provide a simple, reliable and relatively low cost technique for attaching a switch controller to the back of a control panel with the user moveable control element of the controller extending through an aperture in the panel for user control from the front face of the panel.

It is a further object of the present invention to provide a simplified and low cost way of attaching a thermostatic heater controller to the back face of a control panel with a user control element extending through the control panel and to provide such attachment without a requirement for separate fasteners.

The present invention provides a thermostatic switch controller housing with a cover plate attached which has a spring member attached thereto which permits the cover plate to be attached to the switch controller housing the controller shaft to be inserted through a cut-out in the panel and the assembly to be pivoted into locking tabs provided on the panel, with the spring member snapping into a recess provided in the cover plate and into a recess in the panel to lock the controller onto the panel.

BRIEF DESCRIPTION OF THE DRAWINGS

FIG. 5 is a section view taken along section indicating lines 5—5 of FIG. 3.

DETAILED DESCRIPTION OF THE INVENTION

Figure 1:
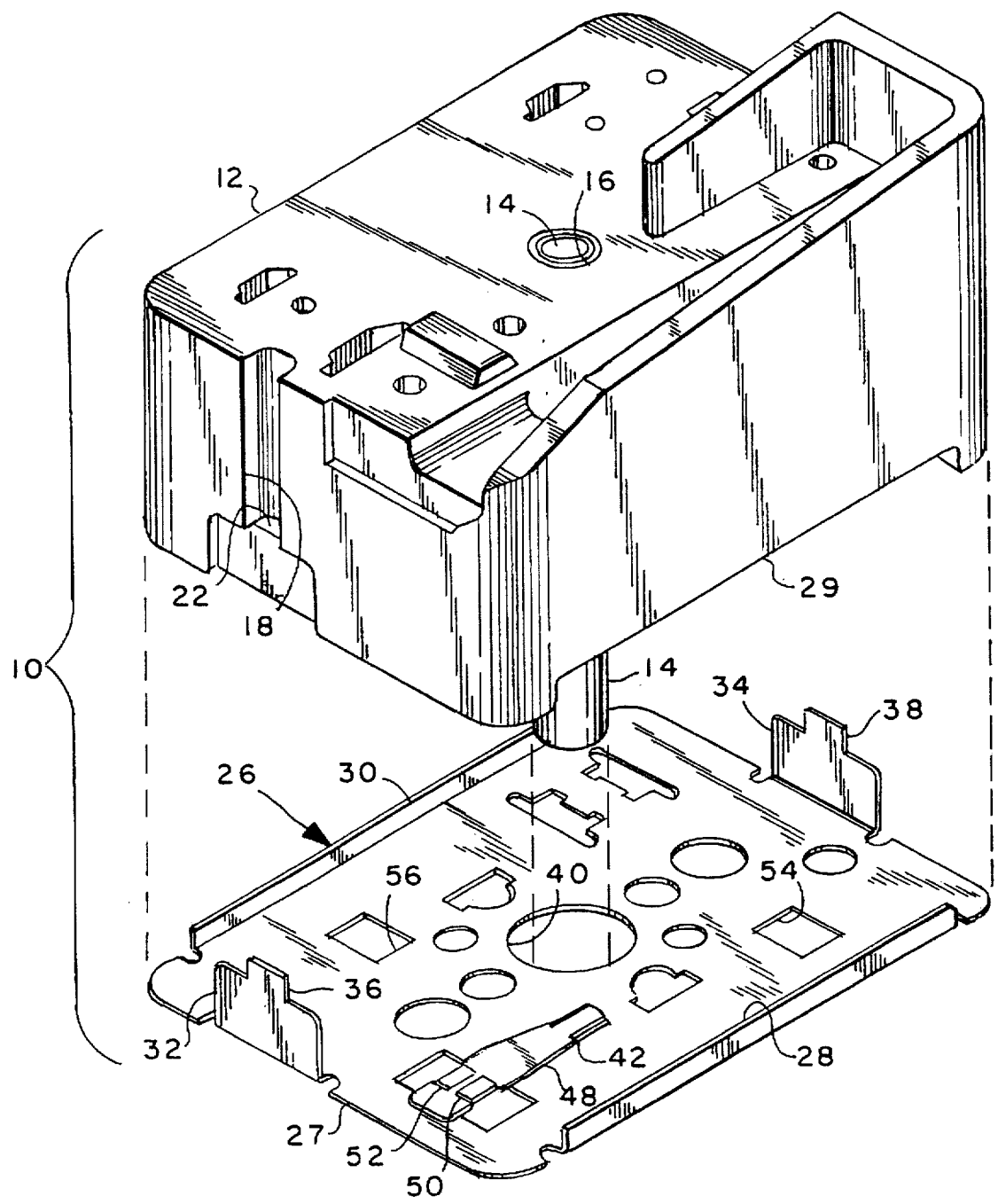
FIG. 1 is an exploded view of a switch housing and the cover plate employing the features of the present invention.
Figure 2:
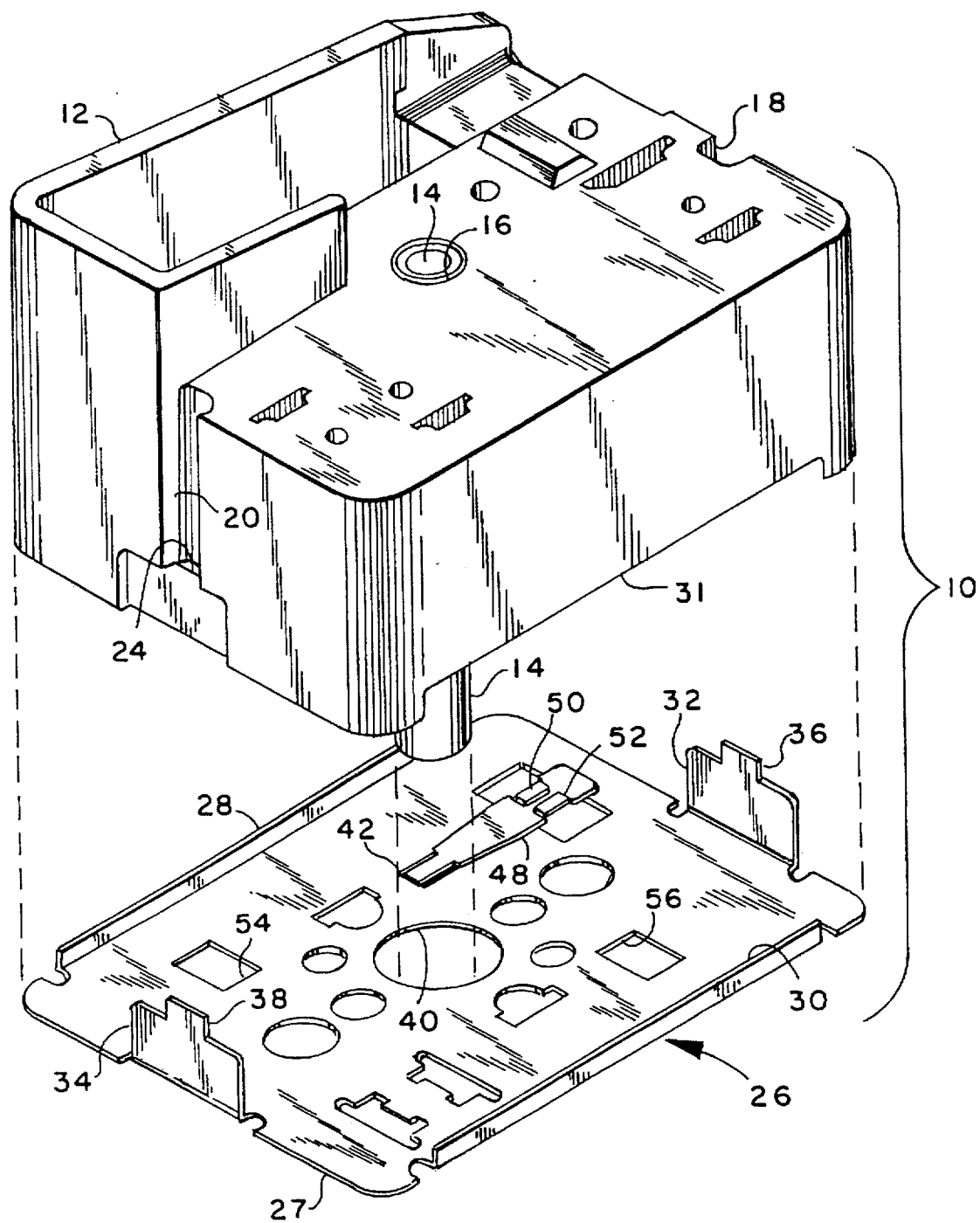
FIG. 2 is a view similar to FIG. 1 taken from the opposite side of the housing and cover as FIG. 1.
Figure 3:
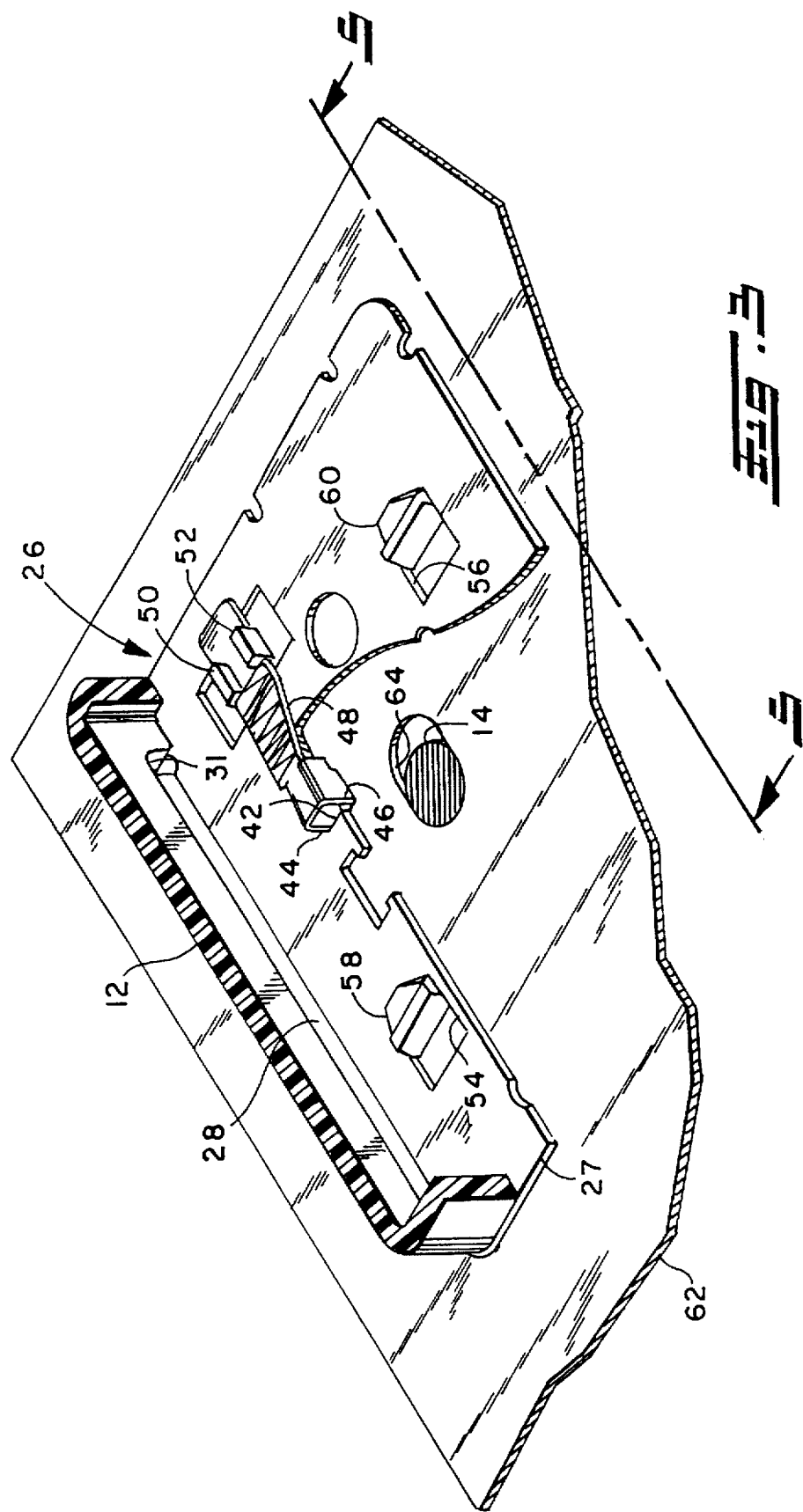
FIG. 3 is a perspective view of a portion of the cover plate of FIG. 1 attached to the back of a control panel.
Figure 4:
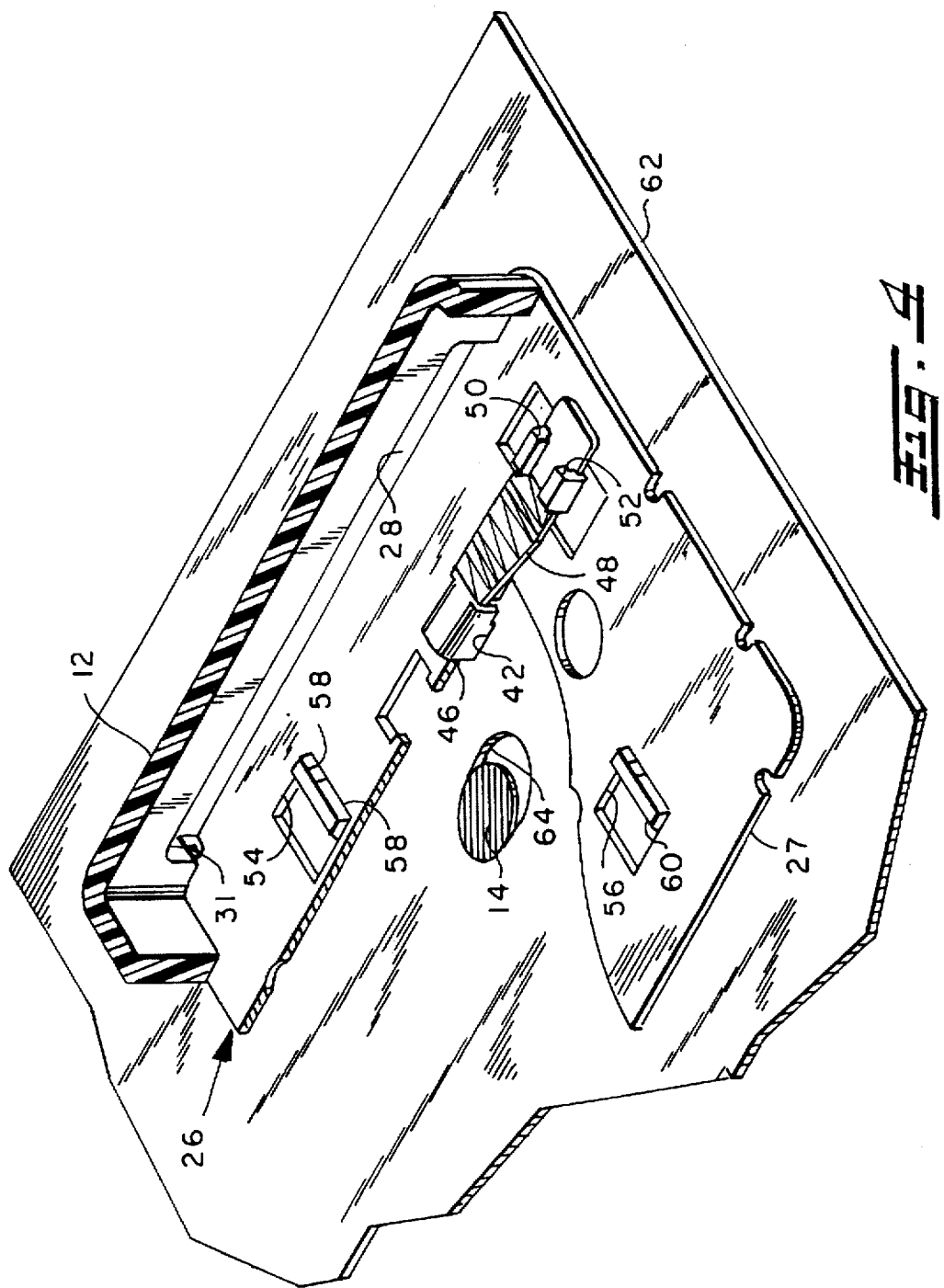
FIG. 4 is a view similar to FIG. 3 taken from the right side of FIG. 3.

Referring to FIGS. 1 and 2, the switch controller assembly is indicated generally at 10 and includes a switch controller housing 12 which contains the unshown switching elements and which may include a thermostatic operator (not shown) which is set at a desired condition by user rotation of a shaft 14 extending downwardly from the switch housing. Typically, the shaft will have its remote end journalled for rotation in the housing as for example in the bore 16.

The housing 12 has a pair of oppositely disposed grooves extending vertically along the sides thereof as denoted by reference numerals 18, 20 which grooves terminate short of the bottom of the housing to form respectively notches or shoulder portions 22, 24.

A cover plate subassembly indicated generally at 26 has a plate 27 configured to conform to the periphery of the switch housing 12; and, in the presently preferred practice has oppositely disposed edges thereof bent to form stiffening flanges 28, 30 which interfit with cut-outs 29, 31 formed in the housing 12. The edges adjacent the flanges 28, 30 have integrally formed thereon upstanding mounting tabs 32, 34 which have reduced width portions thereof denoted by reference numerals 36, 38 configured to interfit respectively grooves 18, 20 when the portions 36, 38 are deformed over the lugs 24, 22. The cover plate 27 has an enlarged clearance aperture 40 formed therein to receive the shaft 14 therethrough.

Referring to FIGS. 1 through 5, cover plate 27 has a rectangular aperture 42 formed therethrough and which has received therein a pair of tabs 44, 46 which form the sides of a generally U-shaped configuration formed on the end of a blade spring 48. Spring 48 has the end thereof remote from tabs 44, 46 secured to plate 27 by a pair of tabs 50, 52 which are formed integrally by stamping or piercing in the plate 27 and folded over the blade spring 48.

Cover plate 26 has an additional pair of apertures 54, 56 formed therein which have in the present practice of the invention a rectangular configuration. Apertures 54, 56 are spaced and located on plate 27 so as to coincide with a pair of preferably S-shaped mounting tabs 58, 60 formed in the backside of a panel 62 to which the switch assembly 10 is to be attached. The panel 62 has an elongated or oval aperture 64 formed therein which has a configuration and size to provide adequate clearance so as to receive the end of shaft 14 and permit lateral movement of the shaft.

At installation, the switch housing and cover plate as an assembly is engaged with the tab 58 through slot 54 in the cover plate and pivoted about an axis normal to shaft 14 and spring tab 48 is deflected away from the cover plate by tabs 44, 46 camming along the surface of panel 62 until the edge of the rectangular aperture 56 engages tab 60 and tabs 44, 46 on the spring drop into aperture 68 in the panel (see FIG. 5) thereby locking the cover subassembly 26 and housing with shaft 14 onto the panel 62 with shaft 14 extending therethrough.

Although the invention has been described as with a user settable thermostatic controller, it will be understood that the invention may be used for panel back mounting of any control utilizing a control shaft extending therethrough.

The present invention thus provides a unique and novel way of assembling a switch controller of the type having a user moveable control shaft extending therefrom onto the back side of a control panel with the shaft extending through the control panel and locking the assembly onto the control panel without the need of separate fasteners.

Although the present invention has been described hereinabove with respect to the illustrated embodiments, it will be understood that the invention is capable of modification and variation and is limited only by the scope of the following claims.

What is claimed is:

1. A method of attaching a switch housing to a panel comprising:
   (a) forming a pair of spaced cut-outs in the switch housing;
   (b) forming an elongated spring member with a portion thereof extending generally transversely to the direction of elongation;
   (c) forming a third cut-out in said housing; and, disposing said spring on the inside of said housing with the transversely extending portion of said spring extending through said third cut-out exteriorly of said housing;
   (d) deforming portions of said third housing and retaining said spring thereon;
   (e) forming a pair of tabs in the surface of said panel and forming a cut-out in said panel;
   (f) disposing the housing cut-outs over the panel tabs and pivoting said housing about said tabs thereby deflecting said spring and locking the transverse spring portion into the panel cut-out.

2. The method defined in claim 1, wherein said step of forming said spring includes forming a generally flat blade spring.

3. The method defined in claim 1, wherein said step of forming said transverse portion of said spring includes forming a generally flat T-shaped blank and folding the arms of said T-shape together in generally spaced parallel arrangement.

4. The method defined in claim 1, wherein said step of deforming said housing includes folding a pair of tabs over said spring remote from said transverse portion.

5. The method defined in claim 1, wherein said step of forming a pair of tabs in the panel includes forming a pair of generally S-shaped tabs.

6. The method defined in claim 1, further comprising:
   (a) forming a housing shell for said switch;
   (b) forming a cover for said shell;
   (c) performing steps (a) through (d) of claim 1 on said cover; and
   (d) attaching said cover to said shell.

7. The method defined in claim 6, wherein said step of attaching said cover to said shell includes releasably fastening.

8. A method of attaching an electrical control in a housing to a panel comprising:
   (a) forming a housing shell and disposing said control thereon;
   (b) forming a cover for said shell and forming a plurality of cut-outs in said cover;
   (c) forming a blade spring having an integral projection extending therefrom;
   (d) inserting said projection through a first of said cut-outs from the inside of said cover and attaching said spring to the inside of said cover;
   (e) attaching said cover to said shell;
   (f) forming a pair of tabs extending from said panel and forming a panel cut-out in said panel; and
   (g) disposing a second and third cut-out in said cover over said tabs and pivoting said housing about said tabs and locking the spring projection in said panel cut-out.

9. The method defined in claim 8, wherein said step of attaching said spring includes deforming portions of said cover over said spring.

10. The method defined in claim 8, wherein the step of forming a blade spring includes forming a generally T-shaped flat blank and folding the arms of said T-shape together in spaced parallel arrangement for forming said integral projection.

11. The method defined in claim 8, wherein said step of attaching said blade spring includes forming a pair of tabs in said cover and folding said tabs over said spring at a location remote from said projection.

12. The method defined in claim 8, wherein said step of attaching said cover to said shell comprises releasably attaching.

* * * * *